(12) United States Patent
Cho et al.

(10) Patent No.: US 10,584,662 B2
(45) Date of Patent: Mar. 10, 2020

(54) METHOD OF CONTROLLING WATER INJECTOR FOR PREVENTING DAMAGE TO CATALYST FOR EXHAUST GAS PURIFICATION AND ENGINE DRIVEN BY METHOD

(71) Applicant: HYUNDAI AUTRON CO., LTD., Seoul (KR)

(72) Inventors: Hyunjae Cho, Seongnam-si (KR); Yongha Kim, Seoul (KR); Sang-Youl Jun, Suwon-si (KR)

(73) Assignee: Hyundai Autron Co., Ltd., Seoul (KR)

( * ) Notice: Subject to any disclaimer, the term of this patent is extended or adjusted under 35 U.S.C. 154(b) by 0 days.

(21) Appl. No.: 16/197,825

(22) Filed: Nov. 21, 2018

(65) Prior Publication Data
US 2019/0186421 A1 Jun. 20, 2019

(30) Foreign Application Priority Data
Dec. 14, 2017 (KR) .................. 10-2017-0172230

(51) Int. Cl.
*F02M 25/022* (2006.01)
*F02M 25/03* (2006.01)
(Continued)

(52) U.S. Cl.
CPC ..... *F02M 25/0227* (2013.01); *F02D 41/0007* (2013.01); *F02D 41/0025* (2013.01);
(Continued)

(58) Field of Classification Search
CPC ........ F02M 26/15; F02M 25/03; F02M 26/03; F02M 43/00; F02D 2200/0802; F02D 41/0235; F02D 41/1446
See application file for complete search history.

(56) References Cited

U.S. PATENT DOCUMENTS

| 7,572,637 B2 * | 8/2009 | Tsumagari ......... B01D 53/9409 |
| | | 423/235 |
| 2007/0217984 A1 * | 9/2007 | Tsumagari ......... B01D 53/9409 |
| | | 423/239.1 |

(Continued)

FOREIGN PATENT DOCUMENTS

| JP | 2002-242662 A | 8/2002 |
| JP | 2005-315234 A | 11/2005 |
| KR | 10-2017-0056195 A | 5/2017 |

*Primary Examiner* — Long T Tran
(74) *Attorney, Agent, or Firm* — Baker & Hostetler LLP; Hyunho Park

(57) ABSTRACT

Disclosed are a method of controlling a water injector for preventing damage to a catalyst for exhaust gas purification and an engine driven by the method. A method of controlling the operation of an injector for injecting water into the combustion chamber of an engine to which a turbo system for increasing the amount of air by compressing air has been applied includes a catalyst state determination step of determining the danger condition of a catalyst for exhaust gas purification by detecting the state of the catalyst, a water injection amount calculation step of calculating a water injection flow value F1 at which a temperature of exhaust gas drops to a preset temperature when the catalyst is in the danger condition, and a water injection step of performing the waterjet operation of a water injector based on the water injection flow value calculated in the water injection amount calculation step.

15 Claims, 5 Drawing Sheets

(51) Int. Cl.
  *F02D 41/02*   (2006.01)
  *F02D 41/00*   (2006.01)
  *F02D 41/14*   (2006.01)
  *F02B 47/02*   (2006.01)
  *F02D 13/02*   (2006.01)

(52) U.S. Cl.
  CPC ......... *F02D 41/0235* (2013.01); *F02M 25/03* (2013.01); *F02B 47/02* (2013.01); *F02D 13/0261* (2013.01); *F02D 41/1446* (2013.01); *F02D 2041/0265* (2013.01); *F02D 2200/0804* (2013.01)

(56) References Cited

U.S. PATENT DOCUMENTS

| | | | | |
|---|---|---|---|---|
| 2010/0037860 | A1* | 2/2010 | Morita | F02D 41/047 123/406.53 |
| 2012/0117954 | A1* | 5/2012 | Yasui | F01N 3/208 60/301 |
| 2014/0366508 | A1* | 12/2014 | Ulrey | F01N 3/04 60/274 |
| 2016/0341117 | A1* | 11/2016 | Ekstrom | F02B 75/021 |
| 2017/0292423 | A1* | 10/2017 | Yoshida | F01N 13/009 |
| 2018/0087424 | A1* | 3/2018 | Wakamatsu | F01N 3/20 |
| 2018/0291843 | A1* | 10/2018 | McQuillen | F02D 41/064 |
| 2018/0320626 | A1* | 11/2018 | Surnilla | F02M 69/046 |
| 2019/0093529 | A1* | 3/2019 | Katsuta | B01D 53/9431 |

* cited by examiner

METHOD OF CONTROLLING WATER INJECTOR FOR PREVENTING DAMAGE TO CATALYST FOR EXHAUST GAS PURIFICATION AND ENGINE DRIVEN BY METHOD

CROSS REFERENCE TO RELATED APPLICATION

The present application claims the benefit of Korean Patent Application No. 10-2017-0172230 filed in the Korean Intellectual Property Office on Dec. 14, 2017, the entire contents of which are incorporated herein by reference.

BACKGROUND OF THE INVENTION

1. Technical Field

The present invention relates to a method of controlling a water injector and an engine driven by the method and, more particularly, to a method of controlling a water injector, which can prevent damage to a catalyst for exhaust gas purification attributable to a temperature rise and an engine driven by the method.

2. Description of the Related Art

An engine to which a turbo system for increasing the amount of air by compressing air has been applied maximizes a scavenging effect by increasing the operation overlap of an inhalation valve and an exhaust valve in order to reduce a turbo lag phenomenon.

The above-described turbo lag refers to responsiveness delay. The responsiveness means the degree of time taken to reach an actual output rise when a driver steps on the accelerator. The delay of acceleration responsiveness is not a phenomenon appearing only in the engine to which the turbo system has been applied, but is a phenomenon appearing even in a natural air-intake engine. However, the engine to which the turbo system has been applied has a problem in that the range of the turbo lag is much greater than that of the natural inhalation engine.

In order to solve such a problem, the above-described scavenging effect is maximized. In this case, a water injector capable of injecting water into the combustion chamber of the engine is mounted on the engine to adjust the temperature of exhaust gas or to improve a combustion characteristic within the combustion chamber of the engine, thereby preventing an unstable operation such as knocking and eventually improving efficiency of the engine.

In the conventional technology, however, when the amount of water injection jet by a water injector is excessively high, a lot of time is taken for the water to be evaporated because all the water is not evaporated within a combustion period, thereby degrading engine combustion characteristics and resulting in an exhaust gas increase.

In the case of the engine to which a turbo system according to a conventional technology has been applied, in the process of maximizing the scavenging effect, air absorbed by the combustion chamber of the engine may be delivered to the exhaust without any change through a combustion chamber. In this case, damage to a catalyst for exhaust gas purification may occur because oxygen is saturated in the catalyst.

In order to solve the problem, oxygen stored in the catalyst is removed by generating post-combustion through rich fuel injection. In this case, however, the catalyst may be damaged due to overheating. Furthermore, there is a problem in that a scavenging region must be reduced in order to prevent the damage.

Accordingly, there is a need for a technology capable of solving the problems of the conventional technology.

PRIOR ART DOCUMENT

Patent Document (Patent Document 0001) Korean Patent Application Publication No. 10-2017-0056195 (May 23, 2017)

SUMMARY OF THE INVENTION

An object of the present invention is to provide a method of controlling a water injector, which can prevent damage to a catalyst for exhaust gas purification attributable to a temperature rise, and an engine driven by the method.

A method of controlling a water injector according to an aspect of the present invention is a method of controlling the operation of an injector for injecting water into the combustion chamber of an engine to which a turbo system for increasing the amount of air by compressing air has been applied. The method may have a configuration, including a catalyst state determination step of determining a danger condition of a catalyst for exhaust gas purification by detecting the state of the catalyst, a water injection amount calculation step of calculating a water injection flow value F1 at which a temperature of exhaust gas may drop to a preset temperature when the catalyst is in the danger condition, and a water injection step of performing the waterjet operation of a water injector based on the water injection flow value F1 calculated in the water injection amount calculation step.

In an embodiment of the present invention, in the catalyst state determination step, the danger condition may be determined when the temperature of the catalyst for exhaust gas purification exceeds the preset temperature.

In an embodiment of the present invention, when the state of the catalyst is determined to be a normal state in the catalyst state determination step, the existing driving of the water injector may be maintained.

In an embodiment of the present invention, the water injection amount calculation step may include calculating a maximum value F2 of a waterjet flow, comparing the calculated maximum value with a maximum flow value F3 capable of being injected by the water injector, adopting a lower flow value of the calculated maximum value and the maximum flow value, and applying the adopted value to the waterjet operation of the water injector.

In this case, the water injection amount calculation step may include calculating a required cooling rate necessary to lower the temperature of the catalyst for exhaust gas purification, calculating an actual cooling rate of the catalyst based on the adopted water injection flow value, and adjusting fuel density of supply air corresponding to a zero fuel efficiency target value when the actual cooling rate is smaller than the required cooling rate.

Furthermore, the water injection amount calculation step may include calculating a required cooling rate necessary to lower the temperature of the catalyst for exhaust gas purification, calculating an actual cooling rate of the catalyst based on the adopted water injection flow value, and adjusting fuel density of supply air corresponding to theory zero fuel efficiency when the actual cooling rate and the required cooling rate are identical.

In an embodiment of the present invention, the method further includes an exhaust gas target temperature value calculation step of calculating a target temperature of the exhaust gas by taking into consideration a rise in the temperature of the catalyst attributable to post-combustion when an operation region of the engine may be a scavenging region. The water injection amount calculation step may include calculating a water injection amount value F4 to be injected by the water injector based on the results of the calculation in the exhaust gas target temperature value calculation step.

In this case, in the exhaust gas target temperature value calculation step, the target temperature of the exhaust gas may be calculated using a current temperature of the catalyst and an air flow value bypassed toward an exhaust pipe due to scavenging as calculation fac.

In an embodiment of the present invention, the method may have a configuration, further including a scavenging region reduction step of reducing the scavenging region when the temperature of the catalyst rises even after the waterjet operation of the water injector is performed in the water injection step.

Furthermore, the present invention may provide an engine including a water injector for injecting water into the combustion chamber of an engine to which a turbo system has been applied. The engine according to an aspect of the present invention may have a configuration, including a catalyst temperature modeling calculation unit configured to calculate a temperature of a catalyst for exhaust gas purification through modeling and to transmit the calculated temperature to a controller, an exhaust gas temperature sensor configured to detect a temperature of exhaust gas discharged through the exhaust valve of the engine and to transmit the detected temperature to the controller, and the controller configured to calculate a water injection flow value at which the temperature of the catalyst may drop to a preset temperature when data values detected by the catalyst temperature modeling calculation unit and the exhaust gas temperature sensor exceed a preset range and to control the water injection operation of the water injector based on the calculated water injection flow value.

In an embodiment of the present invention, the controller may have a configuration for calculating a maximum value F2 of a waterjet flow, compares the calculated maximum value with a maximum flow value F3 capable of being injected by the water injector, adopting a lower flow value of the calculated maximum value and the maximum flow value, and applying the adopted value to the waterjet operation of the water injector.

In an embodiment of the present invention, the controller may calculate a required cooling rate necessary to lower the temperature of the catalyst for exhaust gas purification, may calculate an actual cooling rate of the catalyst based on the adopted water injection flow value, and may adjust fuel density of supply air corresponding to a zero fuel efficiency target value when the actual cooling rate is smaller than the required cooling rate.

Furthermore, the controller may adjust fuel density of supply air corresponding to theory zero fuel efficiency when the actual cooling rate and the required cooling rate are identical.

In an embodiment of the present invention, the controller may calculate a target temperature of the exhaust gas by taking into consideration a rise in the temperature of the catalyst attributable to post-combustion when an operation region of the engine may be a scavenging region, and may calculate a water injection amount value F4 to be injected by the water injector based on a result of the calculation of the target temperature.

In an embodiment of the present invention, the controller may reduce the scavenging region when the temperature of the catalyst rises even after the waterjet operation of the water injector is performed.

<Description of reference numerals>

Figure 1:
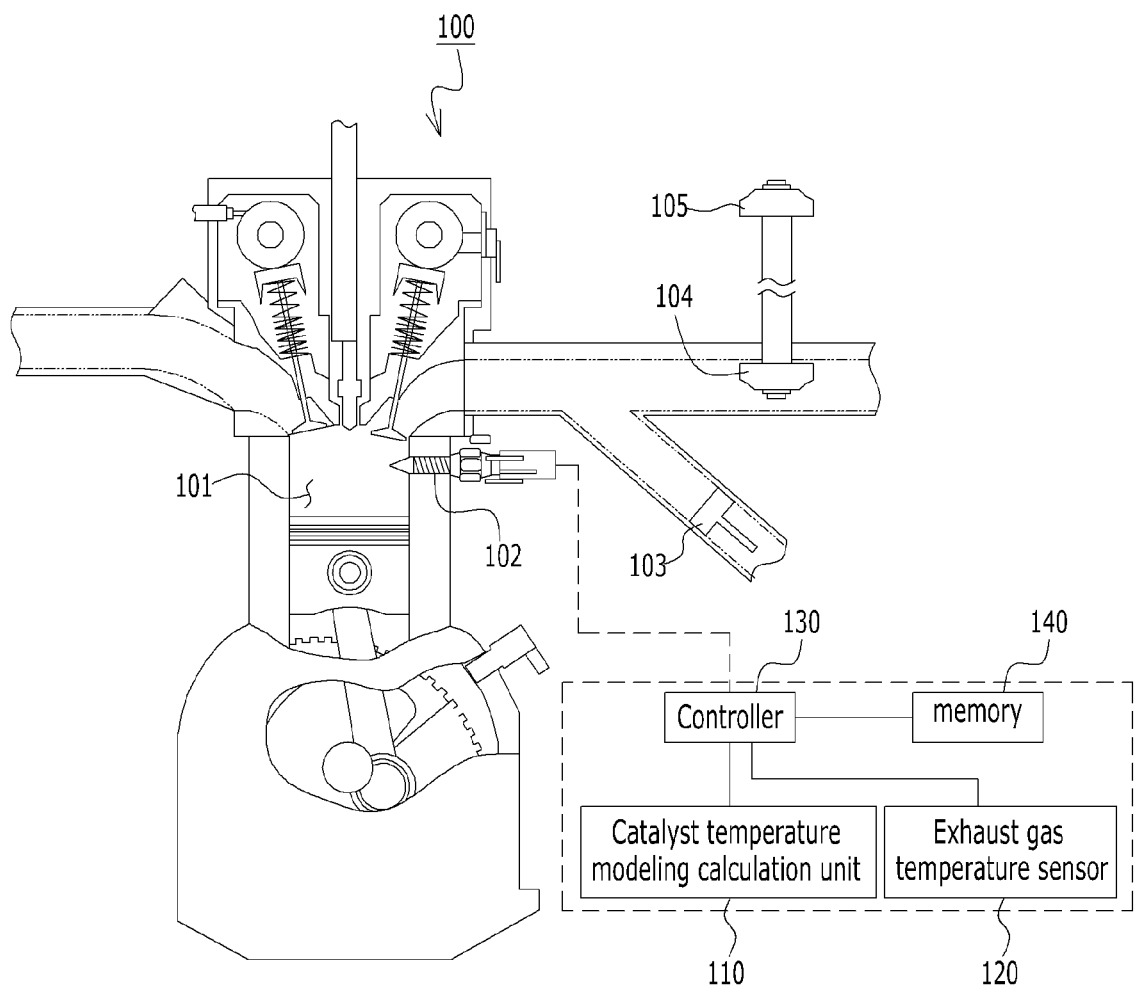
FIG. 1 shows the configuration of an engine including a water injector according to an embodiment of the present invention.

100: engine     101: combustion chamber
102: water injector     103: waste gate
104: turbine     105: compressor
110: catalyst temperature modeling calculation unit
120: exhaust gas temperature sensor
130: controller     140: memory
S100: method of controlling water injector
S110: catalyst state determination step
S115: exhaust gas target temperature value calculation step
S120: water injection amount calculation step
S130: water injection step
S140: scavenging region reduction step

DETAILED DESCRIPTION

Hereinafter, embodiments of the present invention are described in detail with reference to the accompanying drawings. Terms or words used in the specification and claims should not be construed as having common or dictionary meanings, but should be construed as having meanings and concepts that comply with the technical spirit of the present invention.

In the entire specification, when it is described that one member is positioned "on" or "over" the other member, it means that one member may adjoin the other member and a third member may be interposed between the two members. In the entire specification, unless explicitly described to the contrary, the word "include, have, or comprise" will be understood to imply the inclusion of stated elements but not the exclusion of any other elements.

Figure 2:
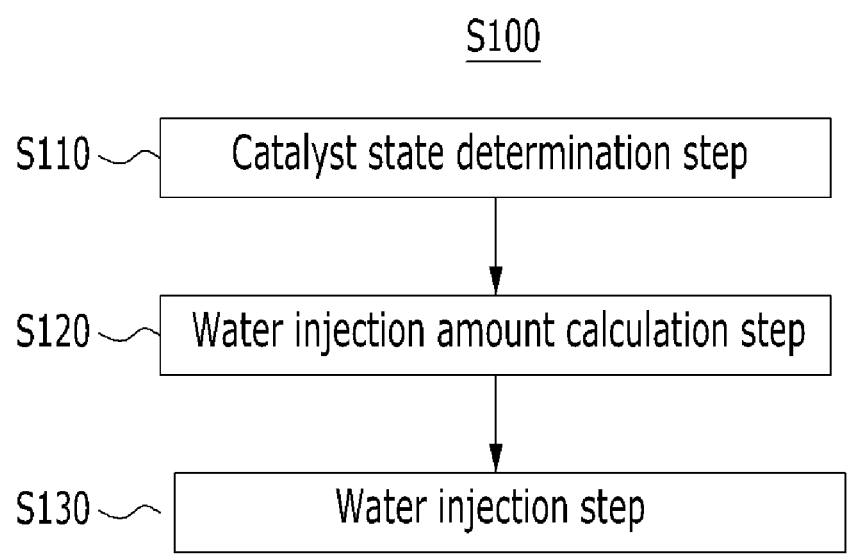
FIG. 2 is a flowchart showing a method of controlling a water injector according to an embodiment of the present invention.

FIG. 1 shows the configuration of an engine including a water injector according to an embodiment of the present invention. FIG. 2 is a flowchart showing a method of controlling a water injector according to an embodiment of the present invention.

Referring to FIGS. 1 and 2, the method S100 of controlling a water injector according to the present embodiment is a method of controlling the operation of an injector for injecting water into the combustion chamber of an engine to which a turbo system for increasing the amount of air by compressing air has been applied. The method includes a catalyst state determination step S110, a water injection amount calculation step S120 and a water injection step S130 having given elements, as shown in FIG. 2.

The method S100 of controlling a water injector according to the present embodiment may provide a method of controlling a water injector, which can prevent damage to a catalyst for exhaust gas purification attributable to a temperature rise, and an engine driven by the method.

Hereinafter, elements forming the method S100 of controlling a water injector according to the present embodiment are described in detail with reference to the accompanying drawings.

Figure 3:
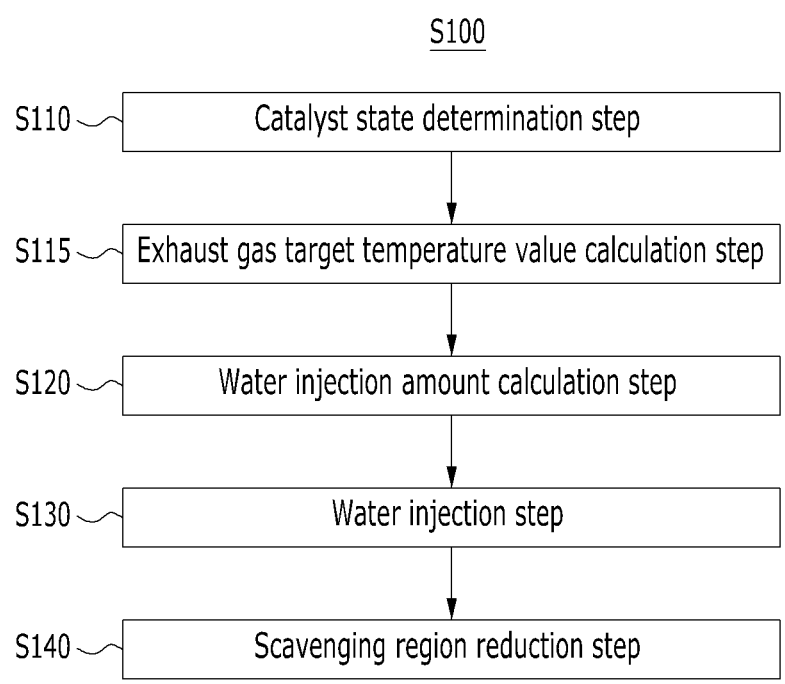
FIG. 3 is a flowchart showing a method of controlling a water injector according to another embodiment of the present invention.
Figure 4:
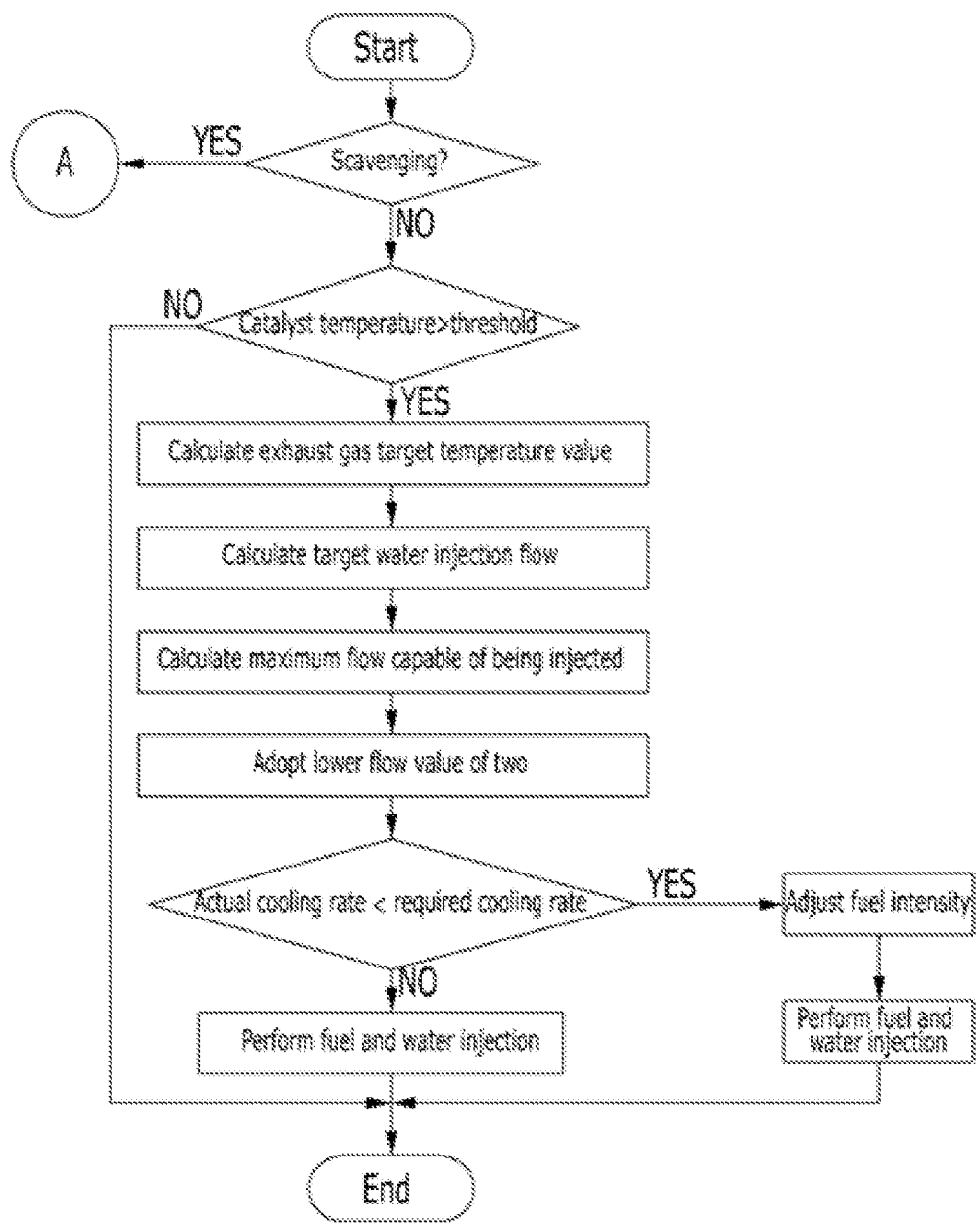
FIG. 4 is a flowchart showing a method of controlling a water injector according to an embodiment of the present invention.
Figure 5:
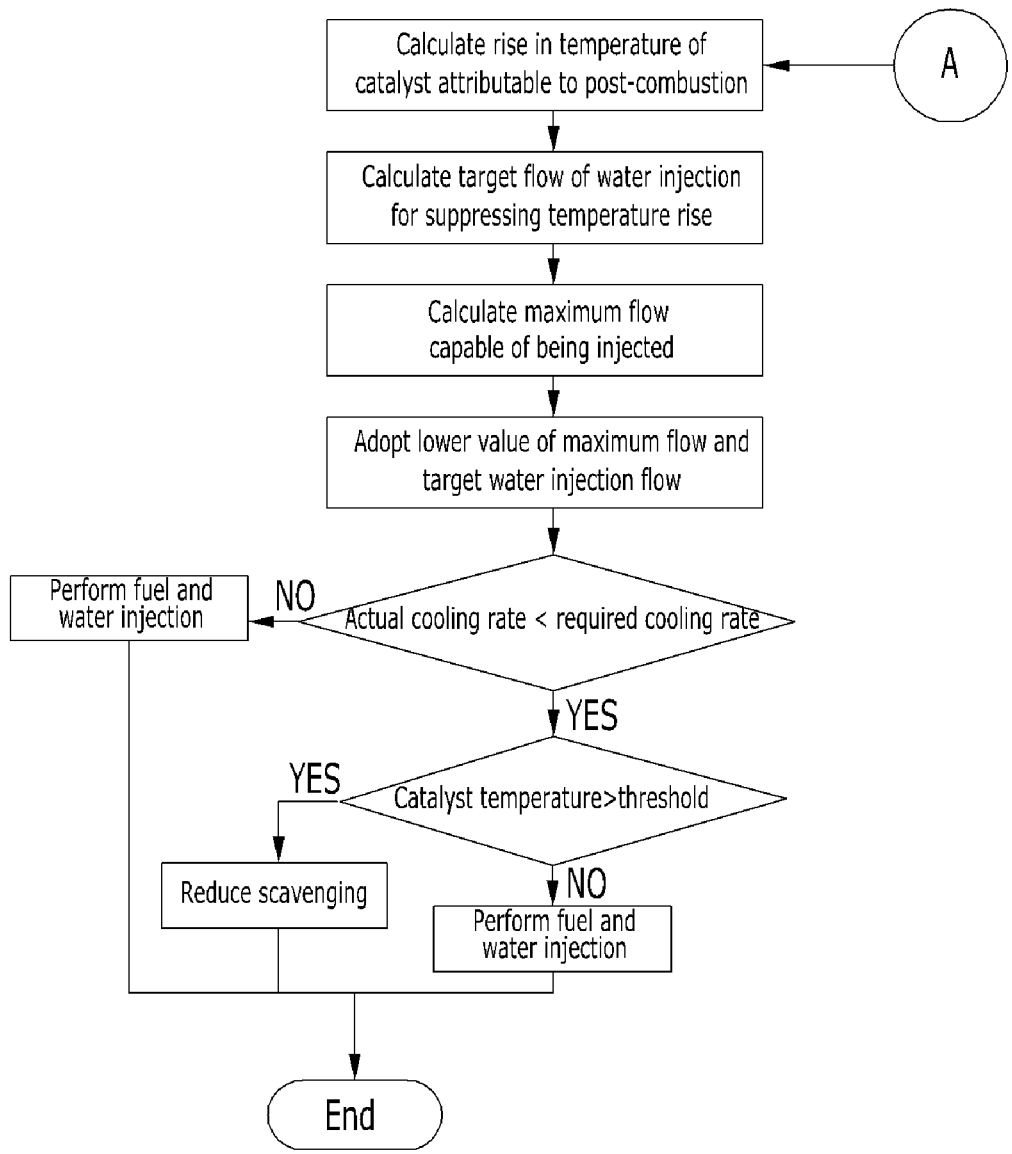
FIG. 5 is a flowchart showing a method of controlling a water injector, which is connected to the flowchart of FIG. 4.

FIG. 3 is a flowchart showing a method of controlling a water injector according to another embodiment of the present invention. FIGS. 4 and 5 show flowcharts illustrating a method of controlling a water injector according to an embodiment of the present invention.

Referring to FIGS. 3 to 5, in the catalyst state determination step S110 according to the present embodiment, a danger condition of a catalyst for exhaust gas purification is determined by detecting the state of the catalyst. When a temperature of the catalyst for exhaust gas purification exceeds a preset temperature, the catalyst may be determined to be the danger condition.

In this case, when the state of the catalyst is determined to be a normal state in the catalyst state determination step S110, the existing driving of a water injector may be maintained.

In the water injection amount calculation step S120, when the catalyst is in the danger condition, a water injection flow value F1 at which the temperature of the exhaust gas may drop to the preset temperature may be calculated.

Specifically, after a maximum value F2 of a waterjet flow is calculated, the calculated maximum value F2 may be compared with a maximum flow value F3 capable of being injected by the water injector. A lower flow value of the two values may be adopted and applied to the waterjet operation of the water injector.

In this case, a required cooling rate necessary to lower the temperature of the catalyst for exhaust gas purification is calculated, and an actual cooling rate of the catalyst based on the adopted water injection flow value is calculated. When the actual cooling rate is smaller than the required cooling rate, fuel density of supply air corresponding to a zero fuel efficiency target value may be adjusted.

In contrast, when the above-described actual cooling rate and the required cooling rate are identical, fuel density of supply air corresponding to theory zero fuel efficiency may be adjusted.

Accordingly, in accordance with the present embodiment, after a maximum value F2 of a waterjet flow is calculated, it is compared with a maximum flow value F3 capable of being injected by the water injector. A lower flow value of the two values is adopted and applied to the waterjet operation of the water injector. Accordingly, an engine combustion characteristic deterioration phenomenon attributable to excessive water injection can be prevented, and an exhaust gas increase phenomenon attributable to combustion characteristic deterioration can be prevented.

In some embodiments, the method S100 of controlling a water injector according to the present embodiment may further include an exhaust gas target temperature value calculation step S115, as shown in FIG. 3.

Specifically, in the exhaust gas target temperature value calculation step S115 according to the present embodiment, when an operation region of the engine is a scavenging region, a target temperature of the exhaust gas is calculated by taking into consideration a rise in the temperature of the catalyst attributable to post-combustion. In this case, a water injection amount value F4 to be injected by the water injector may be calculated based on the results of the calculation obtained in the exhaust gas target temperature value calculation step.

The target temperature of the exhaust gas may be calculated using a current temperature of the catalyst and an air flow value bypassed toward an exhaust pipe due to scavenging as calculation factors.

Accordingly, in accordance with the present embodiment, when the operation region of the engine is the scavenging region, a target temperature of exhaust gas is calculated by taking into consideration a rise in the temperature of a catalyst attributable to post-combustion, a water injection amount value to be injected by the water injector is calculated based on the results of the calculation, and the operation of the water injector is controlled based on the calculated water injection amount value. Accordingly, the scavenging use region can be maintained for a long period of time. As a result, requested output responsiveness of a user to an engine to which a turbo system has been applied can be significantly improved.

In the water injection step S130 according to the present embodiment, the waterjet operation of the water injector is performed based on the water injection flow value F1 calculated in the water injection amount calculation step.

In this case, when the temperature of the catalyst rises even after the waterjet operation of the water injector is performed in the water injection step S130, a scavenging region reduction step S140 of reducing the scavenging region may be performed as shown in FIG. 3.

Accordingly, in accordance with the present embodiment, the method includes the waterjet step S130 of limiting a maximum water injection flow value even in the scavenging region and the scavenging region reduction step S140 of reducing the scavenging region when the temperature of the catalyst rises even after the waterjet operation of the water injector is performed in the water injection step. Accordingly, there can be provided the method of controlling a water injector, which can prevent damage to a catalyst for exhaust gas purification attributable to a temperature rise.

Furthermore, there may be provided an engine 100 driven by the method S100 of controlling a water injector. The engine 100 according to the present embodiment may have a configuration, including a catalyst temperature modeling calculation unit 110, an exhaust gas temperature sensor 120 and a controller 130 performing given roles, as shown in FIG. 1.

Specifically, the catalyst temperature modeling calculation unit 110 may calculate a temperature of a catalyst for exhaust gas purification through modeling and transmit the calculated temperature to the controller 130. The exhaust gas temperature sensor 120 may detect a temperature of exhaust gas discharged through the exhaust valve of the engine and transmit the detected temperature to the controller.

In this case, after calculating a maximum value F2 of a waterjet flow, the controller 130 may compare the calculated maximum value with a maximum flow value F3 capable of being injected by the water injector, may adopt a lower flow value of the two values, and may apply the adopted flow value to the waterjet operation of the water injector.

Furthermore, the controller 130 may calculate a required cooling rate necessary to lower the temperature of the catalyst for exhaust gas purification, may calculate an actual cooling rate of the catalyst based on the adopted water injection flow value, and may adjust fuel density of supply air corresponding to a zero fuel efficiency target value when the actual cooling rate is smaller than the required cooling rate. In contrast, when the actual cooling rate and the required cooling rate are identical, the controller 130 may adjust fuel density of supply air corresponding to theory zero fuel efficiency.

The controller 130 may calculate a target temperature of the exhaust gas by taking into consideration a rise in the temperature of the catalyst attributable to post-combustion when an operation region of the engine is a scavenging region, and may calculate a water injection amount value F4 to be injected by the water injector based on the results of the calculation. In this case, when the temperature of the catalyst rises even after the waterjet operation of the water injector is performed in the water injection step, the controller may reduce a scavenging region.

The memory 140 according to the present embodiment is a generic term of a space or storage region in which data input and output when a given program code for controlling an overall operation of the engine 100 and an operation based on the program code are performed is stored, and may have a form, such as electrically erasable and programmable read only memory (EEPROM), flash memory (FM) or a hard disk drive.

For example, the memory 140 may store a reference amount for a water injection amount, and may store the pressure value of the water injector as an experimentally determined value.

The method S100 of controlling a water injector according to an embodiment of the present invention may be fabricated as a program to be executed in a computer and stored in a computer-readable recording medium. The computer-readable recording medium may include ROM, RAM, CD-ROM, a magnetic tape, a floppy disk, and an optical data storage device, for example. Furthermore, the computer-readable recording medium includes a form of carrier waves (e.g., transmission through the Internet).

The computer-readable recording medium may be distributed to computer systems connected over a network, and code readable by a computer may be stored and executed in the computer systems in a distributed manner. Furthermore, a functional program, code and code segments for implementing the method may be easily reasoned by programmers in the field to which the embodiments belong.

As described above, the method of controlling a water injector according to an embodiment of the present invention includes the catalyst state determination step, water injection amount calculation step and water injection step including given elements, and thus can provide the method of controlling a water injector, which can prevent damage to a catalyst for exhaust gas purification attributable to a temperature rise, and the engine driven by the method.

Furthermore, in accordance with the method of controlling a water injector according to an embodiment of the present invention, after a maximum value F2 of a waterjet flow is calculated, it is compared with a maximum flow value F3 capable of being injected by the water injector, and a lower flow value of the two values is adopted and applied to the waterjet operation of the water injector. Accordingly, an engine combustion characteristic deterioration phenomenon attributable to excessive water injection and an exhaust gas increase phenomenon attributable to combustion characteristic deterioration can be prevented.

Furthermore, in accordance with the method of controlling a water injector according to an embodiment of the present invention, when an operation region of the engine is a scavenging region, a target temperature of exhaust gas is calculated by taking into consideration a rise in the temperature of a catalyst attributable to post-combustion. A water injection amount value to be injected by the water injector is calculated based on the results of the calculation. The operation of the water injector is controlled based on the calculated water injection amount value. Accordingly, a scavenging use region can be maintained for a long period of time. As a result, requested output responsiveness of a user to an engine to which a turbo system has been applied can be significantly improved.

Furthermore, the method of controlling a water injector according to an embodiment of the present invention includes the waterjet step of limiting a maximum water injection flow value even in a scavenging region and the scavenging region reduction step of reducing the scavenging region when a temperature of a catalyst rises even after the water injection operation of the water injector is performed in the water injection step. Accordingly, there can be provided the method of controlling a water injector, which can prevent damage to a catalyst for exhaust gas purification attributable to a temperature rise.

Furthermore, the engine driven by the method of controlling a water injector according to an embodiment of the present invention includes the controller configured to operate according to the catalyst state determination step, water injection amount calculation step and water injection step having given elements. Accordingly, damage to a catalyst for exhaust gas purification attributable to a temperature rise can be prevented, an engine combustion characteristic deterioration phenomenon can be prevented, an exhaust gas increase phenomenon attributable to a reduction in the combustion characteristic can be prevented, and a scavenging use region can be maintained for a long period of time. As a result, there can be provided the engine capable of significantly improving requested output responsiveness of a user to an engine to which a turbo system has been applied.

In the detailed description of the present invention, only some special embodiments of the present invention have been described. It is however to be understood that the present invention is not limited to the special embodiments described in the detailed description, but should be construed as including all of changes, equivalents and substitutes without departing from the spirit and range of the present invention defined by the appended claims.

That is, the present invention is not limited to the above-described specific embodiments and description and may be modified in various ways by a person having ordinary skill in the art to which the present invention pertains without departing from the gist of the present invention written in the claims. Such modifications or changes fall in the range of protection of the present invention.

What is claimed is:

1. A method of controlling an operation of an injector for injecting water into a combustion chamber of an engine to which a turbo system for increasing an amount of air by compressing air has been applied, the method comprising:
   a catalyst state determination step of determining a danger condition of a catalyst for exhaust gas purification by detecting a state of the catalyst;
   a water injection amount calculation step of calculating a water injection flow value F1 at which a temperature of exhaust gas is able to drop to a preset temperature when the catalyst is in the danger condition; and a water injection step of performing a waterjet operation of a water injector based on the water injection flow value F1 calculated in the water injection amount calculation step.

2. The method of claim 1, wherein in the catalyst state determination step, the danger condition is determined when the temperature of the catalyst for exhaust gas purification exceeds the preset temperature.

3. The method of claim 1, wherein when the state of the catalyst is determined to be a normal state in the catalyst state determination step, existing driving of the water injector is maintained.

4. The method of claim 1, wherein the water injection amount calculation step comprises:
calculating a maximum value of a waterjet flow,
comparing the calculated maximum value with a maximum flow value capable of being injected by the water injector,
adopting a lower flow value of the calculated maximum value and the maximum flow value, and
applying the adopted value to the waterjet operation of the water injector.

5. The method of claim 4, wherein the water injection amount calculation step comprises:
calculating a required cooling rate necessary to lower the temperature of the catalyst for exhaust gas purification,
calculating an actual cooling rate of the catalyst based on the adopted water injection flow value, and
adjusting fuel density of supply air corresponding to a zero fuel efficiency target value when the actual cooling rate is smaller than the required cooling rate.

6. The method of claim 4, wherein the water injection amount calculation step comprises:
calculating a required cooling rate necessary to lower the temperature of the catalyst for exhaust gas purification,
calculating an actual cooling rate of the catalyst based on the adopted water injection flow value, and
adjusting fuel density of supply air corresponding to theory zero fuel efficiency when the actual cooling rate and the required cooling rate are identical.

7. The method of claim 1, further comprising an exhaust gas target temperature value calculation step of calculating a target temperature of the exhaust gas by taking into consideration a rise in the temperature of the catalyst attributable to post-combustion when an operation region of the engine is a scavenging region,
wherein the water injection amount calculation step comprises calculating a water injection amount value to be injected by the water injector based on the results of the calculation in the exhaust gas target temperature value calculation step.

8. The method of claim 7, wherein in the exhaust gas target temperature value calculation step, the target temperature of the exhaust gas is calculated using a current temperature of the catalyst and an air flow value bypassed toward an exhaust pipe due to scavenging as calculation factors.

9. The method of claim 7, further comprising a scavenging region reduction step of reducing the scavenging region when the temperature of the catalyst rises even after the waterjet operation of the water injector is performed in the water injection step.

10. An engine comprising a water injector for injecting water into a combustion chamber of an engine to which a turbo system has been applied, the engine comprising:
a catalyst temperature modeling calculation unit configured to calculate a temperature of a catalyst for exhaust gas purification through modeling and to transmit the calculated temperature to a controller;
an exhaust gas temperature sensor configured to detect a temperature of exhaust gas discharged through an exhaust valve of the engine and to transmit the detected temperature to the controller; and
the controller configured to calculate a water injection flow value at which the temperature of the catalyst is able to drop to a preset temperature when data values detected by the catalyst temperature modeling calculation unit and the exhaust gas temperature sensor exceed a preset range and to control a water injection operation of the water injector based on the calculated water injection flow value.

11. The engine of claim 10, wherein the controller calculates a maximum value of a waterjet flow, compares the calculated maximum value with a maximum flow value capable of being injected by the water injector, adopts a lower flow value of the calculated maximum value and the maximum flow value, and applies the adopted value to the waterjet operation of the water injector.

12. The engine of claim 10, wherein the controller calculates a required cooling rate necessary to lower the temperature of the catalyst for exhaust gas purification, calculates an actual cooling rate of the catalyst based on the adopted water injection flow value, and adjusts fuel density of supply air corresponding to a zero fuel efficiency target value when the actual cooling rate is smaller than the required cooling rate.

13. The engine of claim 10, wherein the controller calculates a required cooling rate necessary to lower the temperature of the catalyst for exhaust gas purification, calculates an actual cooling rate of the catalyst based on the adopted water injection flow value, and adjusts fuel density of supply air corresponding to theory zero fuel efficiency when the actual cooling rate and the required cooling rate are identical.

14. The engine of claim 10, wherein the controller calculates a target temperature of the exhaust gas by taking into consideration a rise in the temperature of the catalyst attributable to post-combustion when an operation region of the engine is a scavenging region, and calculates a water injection amount value to be injected by the water injector based on a result of the calculation of the target temperature.

15. The engine of claim 14, wherein the controller reduces the scavenging region when the temperature of the catalyst rises even after the waterjet operation of the water injector is performed.

* * * * *